US007631071B2

(12) United States Patent
Cabrera et al.

(10) Patent No.: US 7,631,071 B2
(45) Date of Patent: *Dec. 8, 2009

(54) MECHANISM FOR ENSURING PROCESSING OF MESSAGES RECEIVED WHILE IN RECOVERY MODE

(75) Inventors: Luis Felipe Cabrera, Bellevue, WA (US); George P. Copeland, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 837 days.

This patent is subject to a terminal disclaimer.

(21) Appl. No.: 10/763,553

(22) Filed: Jan. 23, 2004

(65) Prior Publication Data

US 2005/0198554 A1   Sep. 8, 2005

(51) Int. Cl.
*G06F 15/173* (2006.01)
(52) U.S. Cl. .......................... 709/224; 709/232; 714/15; 714/21
(58) Field of Classification Search ................ 709/224, 709/232; 714/15, 21
See application file for complete search history.

(56) References Cited

U.S. PATENT DOCUMENTS

| 5,440,726 | A | * | 8/1995 | Fuchs et al. ................ 714/20 |
| 5,557,798 | A | | 9/1996 | Skeen et al. ............... 395/650 |
| 5,627,964 | A | * | 5/1997 | Reynolds et al. ............ 714/46 |
| 5,983,265 | A | * | 11/1999 | Martino, II ................ 709/206 |
| 6,161,198 | A | * | 12/2000 | Hill et al. .................. 714/15 |
| 6,247,060 | B1 | * | 6/2001 | Boucher et al. ............ 709/238 |
| 2002/0029285 | A1 | * | 3/2002 | Collins .................... 709/232 |
| 2002/0107807 | A1 | * | 8/2002 | Ketonen et al. ............. 705/51 |
| 2003/0126229 | A1 | * | 7/2003 | Kantor et al. .............. 709/217 |
| 2003/0135590 | A1 | * | 7/2003 | Rezaul Islam et al. ...... 709/220 |

OTHER PUBLICATIONS

Efficient Message Dispatch in Object-Oriented Systems, Mayur Naik and Rejeev Kumar, Mar. 2000, p. 49-58, ACM SIGPLAN.
Cybernetics and Systems—Towards a Unified Messaging Environment Over the Internet, Leonard Chong, Siu Cheung Hui and Chai Kiat Yeo, 1999, p. 533-549.
ECOOP ' 95 Object-Oriented Programming, Message Dispatch on Pipelined Processors, Karel Driesen, Urs Holzle and Jan Vitek, 1995, p. 252-282.

* cited by examiner

*Primary Examiner*—Dohm Chankong
*Assistant Examiner*—Thomas J Dailey
(74) *Attorney, Agent, or Firm*—Workman Nydegger

(57) ABSTRACT

Mechanisms for operating in recovery mode while ensuring reliable message processing for messages received during the recovery operation mode. Upon receiving a message corresponding to a particular message transaction, the instance responsible for that message transaction determines from state information corresponding to the transaction, whether or not that instance is operating in normal mode, or recovery mode. If the state information reflects normal operation mode, then the instance processes the message. If recover mode, then the instance evaluates whether or not the message is a normal message suitable for normal operation mode, or a recovery message suitable for recovery operation mode. If the message is a normal message, then the message is placed in a persistent queue for later processing. If the message is a recovery message, the message is processed. Upon completion of recovery, the normal message in the queue may be processed.

23 Claims, 3 Drawing Sheets

MECHANISM FOR ENSURING PROCESSING OF MESSAGES RECEIVED WHILE IN RECOVERY MODE

BACKGROUND OF THE INVENTION

1. The Field of the Invention

The present invention relates to computing technology; and more specifically, to mechanisms for ensuring that messages received during recovery mode are processed despite being in recovery mode.

2. Background and Related Art

Computing technology has transformed the way we work and play. Computing systems now take a wide variety of forms including desktop computers, laptop computers, tablet PCs, Personal Digital Assistants (PDAs), household devices and the like. Currently, computing system technology has improved significantly. Numerous application instances may run on a single computing system at the same time. This complexity provides for ever-improving computing utility.

Despite such improvements, however, computing systems do still occasionally experience system failures. Some system failures may prohibit the computing system from performing clean up processes prior to shutting down completely. Accordingly, instances that were in process at the time of the system failure may have inconsistent state and run improperly during subsequent power-up. Such instances often enter recovery mode when such inconsistency or improper operation is detected.

During recovery mode, the computing system performs recovery code designed to remove the inconsistency and regarding proper operation. However, oftentimes, when performing such recovery code, normal operations are put on hold. For example, consider a server computing system that offers network services to other computing systems. When the server computing system is in recovery mode, the other computing systems may continue to send messages to the server computing system as normal. However, the server computing system may not ever be able to respond to these messages. Once the server computing system has completed recovery, there may be no record of the messages it received while recovering. If the recovery process was long, a significant number of messages may have been received during the recovery process. There may be no record of some, if not all, of these received messages.

What would be advantageous are mechanisms for ensuring that messages that are received during recovery mode are properly processed upon recovery, even if recovery takes a significant period of time in which many messages may have been received.

BRIEF SUMMARY OF THE INVENTION

The foregoing problems with the prior state of the art are overcome by the principles of the present invention, which are directed towards mechanisms for permitting a computing system to operate in recovery mode while ensuring reliable message processing for messages received during the recovery mode.

Upon receiving a message corresponding to a particular message transaction. The instance responsible for governing that message transaction determines from state information corresponding to the transaction, whether or not that instance is operating in normal mode, or recovery mode. In an embodiment in which the state information is stored in persistent media between messages (hereinafter called the "inter-message persistence embodiment"), the computing system may load this corresponding state information into system memory upon receiving a message for the corresponding message transaction.

If the state information reflects that the instance is in normal mode, then the instance processes the message. In the inter-message persistence embodiment, the computing system may then save the state information back into persistent media after processing the message.

Upon receiving the message, if the instance instead determines that it is in recovery mode, then the instance evaluates whether or not the message is a normal message suitable for normal operation mode, or a recovery message suitable for recovery operation mode. If the message is a normal message, then the message is placed in a persistent queue for later processing. The instance may then optionally perform further processing towards completing recovery such as, for example, sending a recovery message to another computing system. In the inter-message persistence embodiment, the state information may then be saved to persistent memory.

If the message is a recovery message, the message is processed. If this processing allows the instance to exit from recovery mode, the instance sets the state information to indicate normal operation mode. Any normal messages in the message queue may then be processed since normal operation has been achieved. In the inter-message persistence embodiment, the state information may then be saved to persistent memory.

Accordingly, the normal messages are preserved for execution at a proper time if the normal messages are received while the instance is in recovery mode. Furthermore, in the inter-message persistence embodiment, the state information is preserved in persistent memory in between messages, thereby supporting reliable recovery even during long running transactions.

Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
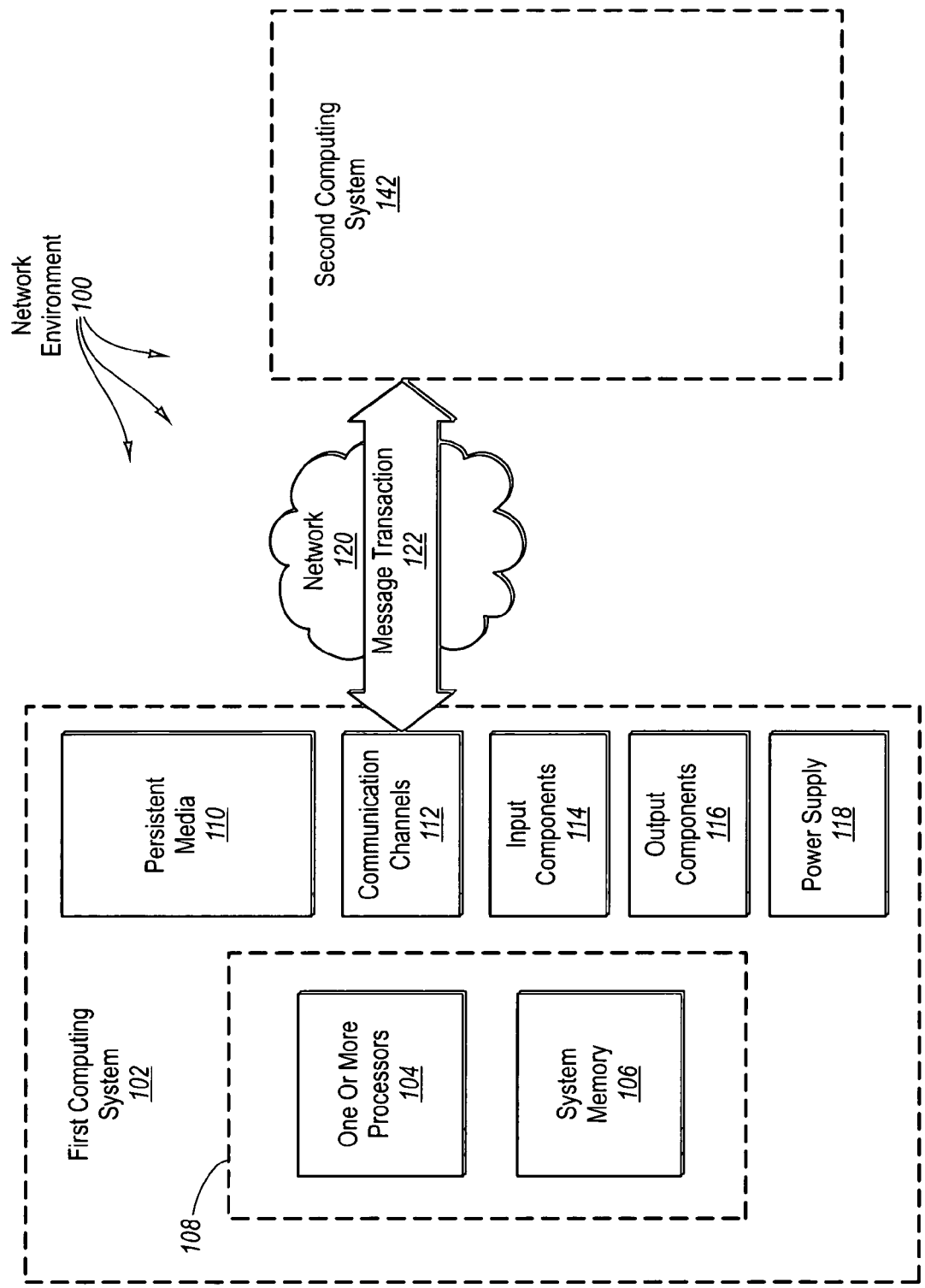
FIG. 1 illustrates a suitable computing system that may implement features of the present invention.

The principles of the present invention relate to mechanisms for permitting a computing system to operate in recovery mode while ensuring reliable message processing for messages received during the recovery mode operations. Upon receiving a message corresponding to a particular message transaction, the instance responsible for governing that message transaction determines from state information corresponding to the transaction, whether or not that instance is operating in normal mode, or in recovery mode. If the state information reflects normal operation mode, then the instance processes the message. If recover mode, then the instance evaluates whether or not the message is a normal message suitable for normal operation mode, or a recovery message suitable for recovery operation mode. If the message is a normal message, then the message is placed in a persistent queue for later processing. If the message is a recovery message, the message is processed. Upon completion of recovery, the normal message in the queue may be processed. Accordingly, the normal messages are preserved for execution at a proper time if the normal messages are received while the instance is in recovery mode.

Turning to the drawings, wherein like reference numerals refer to like elements, the invention is illustrated as being implemented in a suitable computing environment. The following description is based on illustrated embodiments of the invention and should not be taken as limiting the invention with regard to alternative embodiments that are not explicitly described herein.

In the description that follows, the invention is described with reference to acts and symbolic representations of operations that are performed by one or more computing systems, unless indicated otherwise. As such, it will be understood that such acts and operations, which are at times referred to as being computer-executed, include the manipulation by one or more processors of the computing system of electrical signals representing data in a structured form. This manipulation transforms the data or maintains them at locations in the memory system of the computer, which reconfigures or otherwise alters the operation of the computing system in a manner well understood by those skilled in the art. The data structures where data are maintained are physical locations of the memory that have particular properties defined by the format of the data. However, while the invention is being described in the foregoing context, it is not meant to be limiting as those of skill in the art will appreciate that several of the acts and operations described hereinafter may also be implemented in hardware.

FIG. 1 shows a schematic diagram of an example network environment in which the principles of the present invention may be employed. The network environment 100 includes a computing system 102. For descriptive purposes, the architecture portrayed for the computing system 102 is only one example of a suitable computing system in which the principles of the present invention may be employed. The architecture described for the computing system 102 is not intended to suggest any limitation as to the scope of use or functionality of the invention. Neither should the computing systems described herein be interpreted as having any dependency or requirement relating to anyone or combination of components illustrated in FIG. 1. In this description and in the claims, a computing system is defined as any system having one or more processors that are capable of executing instructions from system memory.

The invention is operational with numerous other general-purpose or special-purpose computing or communications environments or configurations. Examples of well known computing systems, environments, and configurations suitable for use with the invention include, but are not limited to, mobile telephones, pocket computers, personal computers, servers, multiprocessor systems, microprocessor-based systems, minicomputers, mainframe computers, and distributed computing environments that include any of the above systems or devices.

In its most basic configuration represented within the dashed lines 108, the computing system 102 typically includes one or more processors 104 and system memory 106. The system memory 106 is most typically volatile and may be, for example, Random Access Memory, although this is not required. The computing system 102 also includes persistent media 110 which may include any storage media capable of storing information despite system failures. For example, persistent media 110 may include magnetic or optical storage devices, although this is not required.

As used herein, the term "module" or "component" can refer to software objects or routines that execute on the computing system. The different components, modules, engines, and services described herein may be implemented as objects or processes that execute on the computing system (e.g., as separate threads). While the system and methods described herein are preferably implemented in software, implementations in software and hardware or hardware are also possible and contemplated.

Computing system 100 may also contain communication channels 112 that allow the host to communicate with other systems and devices such as, for example, second computing system 142. Communication channels 112 are examples of communications media. Communications media typically embody computer-readable instructions, data structures, program modules, or other data in a modulated data signal such as a carrier wave or other transport mechanism and include any information-delivery media. By way of example, and not limitation, communications media include wired media, such as wired networks and direct-wired connections, and wireless media such as acoustic, radio, infrared, and other wireless media. The term computer-readable media as used herein includes both storage media and communications media.

The computing system 100 may also have input components 114 such as a keyboard, mouse, pen, a voice-input component, a touch-input device, and so forth. Output components 116 include screen displays, speakers, printer, etc., and rendering modules (often called "adapters") for driving them. The computing system 100 has a power supply 118. All these components are well known in the art and need not be discussed at length here.

The computing system 102 may communicate with any number of computing systems over a network 120. However, in the illustrated embodiment, the first computing system 102 is communicating with the second computing system 142 over the network 120. In order to accomplish the task, the computing systems 102 and 142 exchange messages in a particular pattern of exchange represented generally by message transaction 122. Also, the use of the terms "first", "second" and so forth to modify an item is only intended to distinguish one item from another, and does not imply any sort of sequential ordering per se.

The particular message exchange pattern associated with the transaction 122 defines which computing system is to send which message at any given point in the message exchange. The message exchange pattern depends on the task to be accomplished, and the protocols used to exchange messages. The messages may be any electronic message such as, for example, a HyperText Transport Protocol (HTTP) message or a Simple Object Access Protocol (SOAP) message.

Figure 2:
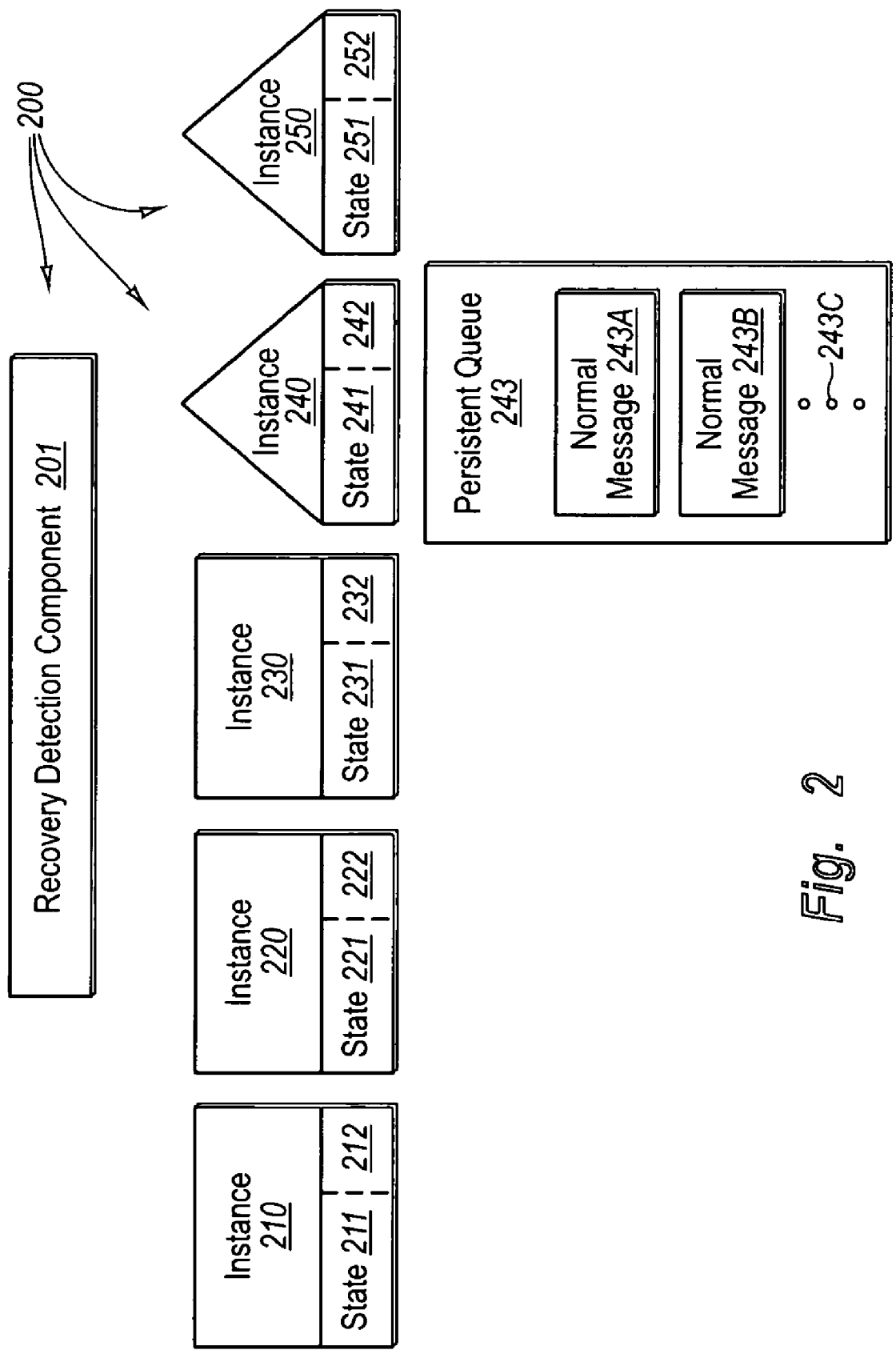
FIG. 2 illustrates various components that may be instantiated in system memory in accordance with the principles of the present invention.

FIG. 2 illustrates various components 200 that may be instantiated in system memory 106 in accordance with the principles of the present invention. The computing system may be engaged in multiple message transactions. A "message transaction" is defined as an exchange of messages with a particular client computing system, the exchange following a message exchange pattern. Accordingly, the system memory may include information for multiple transactions.

There is state information corresponding to each of the transactions. For example, state information 211, 221, 231, 241 and 251 each correspond to an individual message transaction. Accordingly, in the illustrated embodiment of FIG. 2, the computing system has state information for five different message transactions in system memory. Each of the state information has recovery mode information indicating whether or not the corresponding instance is in recovery mode or in normal mode. For example, state information 211, 221, 231, 241 and 251 include corresponding recovery mode information 212, 222, 232, 242 and 252.

In addition to state information, the computing system needs appropriate executable code in order to properly manage a message transaction. In one embodiment referred to herein as the "per transaction instance embodiment", each message transaction may be governed by an instance of an application designed for the corresponding message transaction type.

Suppose, in this example, that state information 211, 221 and 231 correspond to state information for different message transactions of the same message exchange pattern type. In the per transaction instance embodiment, each of the state information 211, 221 and 231 is managed by a corresponding instance 210, 220, and 230 of an application that is designed to manage message transactions of that particular message exchange pattern type. Accordingly, each of the instances 210, 220 and 230 are illustrated as being rectangular, to emphasize that they are instances of the same application.

Suppose also, that state information 241 and 251 correspond to different message transactions of the same message exchange pattern type, that is different than the message transaction type for instances 210, 220 and 230. In the per transaction instance embodiment, each of the state information 241 and 251 is managed by a corresponding instance 240 and 250 of an application that is designed to manage message transactions of the different transaction type. These instances 240 and 250 are illustrated as being triangular, to emphasize that they are instances of the same application, but a different application than the instances 210, 220 and 230.

In another embodiment referred to herein as "the multiple transaction instance embodiment", a single instance of an application may be able to simultaneously manage multiple message transactions of the same message exchange pattern type. In that case, state 211, 221 and potentially 231 would be managed by a single instance (e.g., instance 210) of an application, while state 241 and 242 would be managed by a single instance (e.g., instance 240) of another application.

In yet another embodiment referred to herein as "the multiple message exchange pattern instance embodiment", a single instance of an application may be able to simultaneously manage multiple message transactions of different message exchange pattern types. In that case, state 211, 221, 231, 241 and 251 may all be managed by a single instance (e.g., instance 210).

The principles of the present invention apply regardless of whether the per transaction instance embodiment, the multiple transaction instance embodiment, or the multiple message exchange pattern instance embodiment is in effect. However, the remainder of this description will focus on the per transaction instance embodiment as illustrated in FIG. 2.

Each message exchange pattern type may correspond to a particular task type. For example, the application corresponding to instances 210, 220 and 230 may govern message exchange patterns for purchasing an airplane. Each instance is responsible for governing a particular transaction that corresponds the message exchange pattern. For example, instance 210 may govern a message exchange pattern for client A's purchase of an airplane; instance 220 may govern a message exchange pattern for client B's purchase of an airplane; and instance 230 may govern a message exchange pattern for client C's purchase of an airplane. Furthermore, the application corresponding to instances 240 and 250 may govern message exchange patterns for paying off a mortgage. For example, instance 240 may govern a message pattern for client D's payment of a mortgage; while instance 250 may govern a message pattern for client E's payment of a mortgage.

The system memory also has instantiated thereon a recovery detection component 201, which is configured to detect when an instance corresponding to message transaction state information is in recovery mode, and then record the recovery mode status in the corresponding state information.

Figure 3:
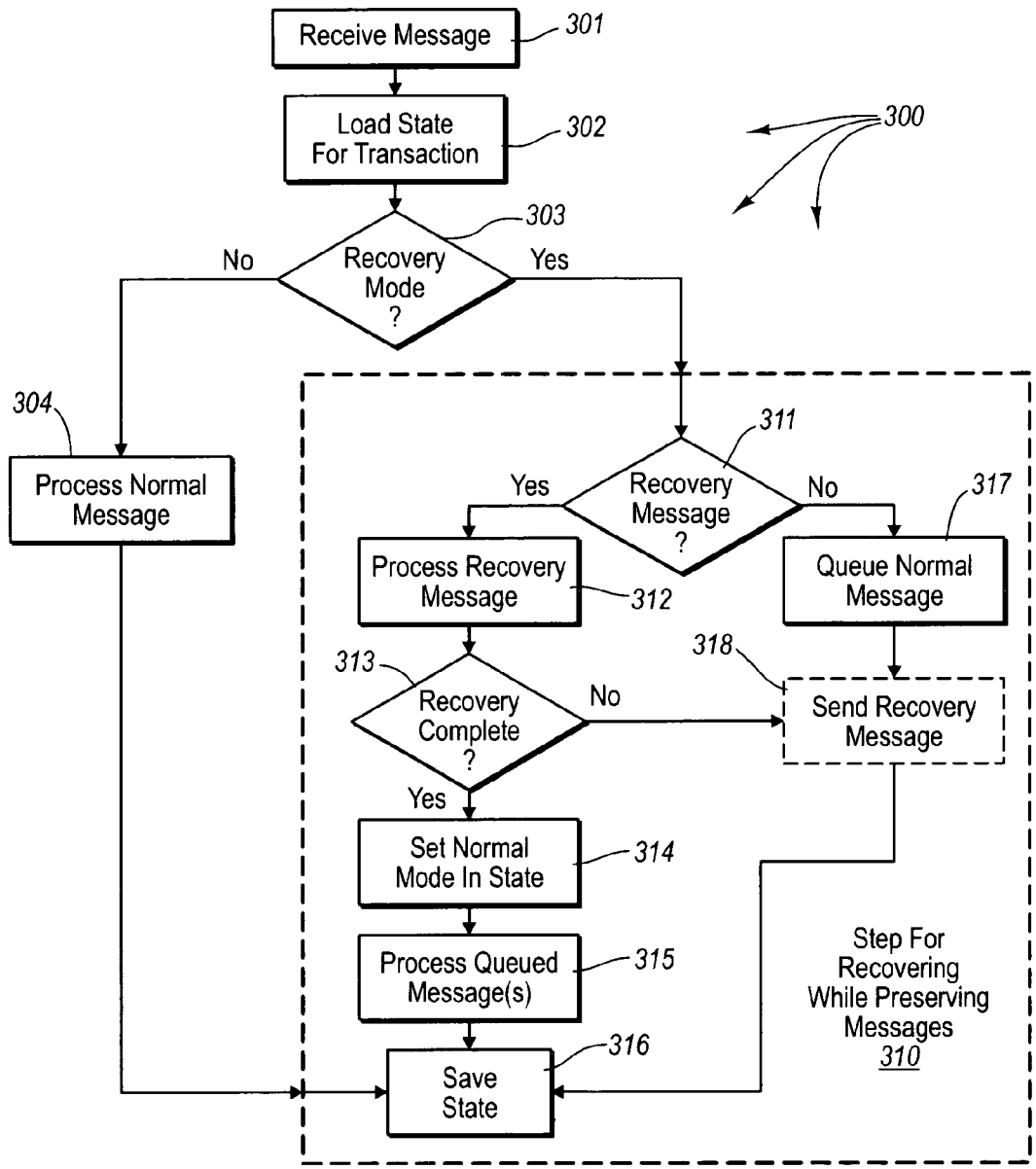
FIG. 3 illustrates a method for recovering while preserving the ability to respond to messages.

FIG. 3 illustrates a flowchart of a method 300 for the computing system operating in recovery mode while ensuring reliable message processing for messages received during the recovery mode operations. The method is initiated upon the receipt of a message (act 301), and may be repeated each time a message for a particular message transaction is received.

In response, if the state information for the message transaction is not yet in system memory, then the state information is loaded from persistent media into system memory (act 302). Referring to FIG. 1, the state information may be loaded from persistent media 110 into system memory 106. Referring to FIG. 2, the state information may be the appropriate one of state information 211, 221, 231, 241 and 251 depending on the message transaction to which the received message belongs. If the instance that manages that message transaction is not already instantiated in system memory, the instance is instantiated in system memory as well.

The instance may then determine from the state information corresponding to the particular message transaction whether or not the instance governing the particular message transaction is in recovery mode (decision block 303). As previously mentioned, this recovery mode status information may be present in the state information corresponding to the message transaction. If the instance is in normal mode (the No branch in decision block 303), then the message is processed (act 304). On the other hand, if the instance is in recovery mode (the Yes branch in decision block 303), then the instance performs a functional, result-oriented step for recovering while preserving normal messages (step 310). This step may include any corresponding acts for accomplishing this result. However, in the illustrated embodiment, this includes decision block 311, act 312, decision block 313, and acts 314 through 318.

In particular, if in recovery mode, the instance makes a determination on whether or not the message is a normal message suitable for normal mode operations (the No branch in decision block 311) or a recovery message suitable for recovery mode operations (the Yes branch in decision block 311). This determination may be made by, for example, reading or information from the message that identifies the message as a normal or recovery message. This determination may also be derived from the internal state of the instance. This internal state may track, among other things, the status of the desired message exchange pattern.

If the message is a normal message (the No branch in decision block 311), then the instance cannot yet process the normal message, since the instance is operating in recovery mode and may not yet have consistent state information needed to process the normal message. In this case, the normal message is placed in a persistent queue for later processing (act 317). Referring to FIG. 2, the instance 240 may be operating in recovery mode. Accordingly, the corresponding message transaction may include a persistent queue 243 that includes one or more normal messages that were received while the instance 240 was in recovery mode. In this example, the persistent queue 243 includes normal message 243A, normal message 243B, amongst potentially many others as represented by the vertical ellipses. Optionally, the computing system may then save the state information in persistent media (act 316) so that recover mode operation may then complete.

Upon receiving a subsequent message (returning to act 301), the state information is once again loaded from persistent media to system memory (act 302). The instance is still in recovery mode (the Yes branch in decision block 303). If the message is a normal message (the No branch in decision block 311), then this message is queued as well. However, if the message is a recovery message (the Yes branch in decision block 311), the recovery message is processed (act 312). If this processing completes recovery of the instance governing the particular message transaction (the Yes branch in decision block 313), then the state information for the message transaction is set to reflect normal mode operation (act 314). The queued normal messages that were received while in recovery mode may then be processed (act 315) since the state information for that message transaction is once again reliable. The state information may then be saved to persistent media (act 316). If the processing does not result in recovery, the instance may send an optional recovery message to another computing system to properly resolve the recovery (act 318). A recovery message may also optionally be sent (act 318) after queuing the normal messages (act 317).

Accordingly, the normal messages are preserved for execution at a proper time if the normal messages are received while the instance is in recovery mode. Furthermore, in the inter-message persistence embodiment, the state information is preserved in persistent media in between messages, thereby supporting reliable recovery even during long running transactions.

Figure 4:
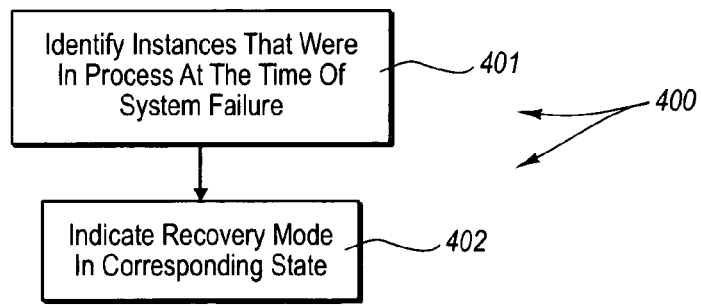
FIG. 4 illustrates a method for indicating whether or not an application instance is in recovery mode.

FIG. 4 illustrates a method 400 for indicating whether or not an application instance is in recovery mode. This method may be performed by, for example, by the recovery detection component 201. This method 400 is just one of many ways of detecting whether or not an instance should be suspicious about whether or not it is running normally.

The recovery detection component identifies a plurality of instances that were running at the time of a system failure (act 401), and indicating in state information associated with each of the identified plurality of instances that the corresponding instance is in recovery mode (act 402). This may occur, for example, by the recovery mode detection module (or the instance itself). When the instance starts, and determines that it is operating in normal mode (the No branch in decision block 303), part of the execution of normal code may actually be for the instance to persistently set its own state as reflecting recovery mode in persistent media. Once processing is complete for a particular message, the recover detection module 201 or the instance itself may change the state information to reflect a normal mode. Should the instance terminate abnormally, the persistent state information will reflect a recovery mode during the next loading of the state information from persistent media. This would prompt the instance to go into recovery mode.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

What is claimed and desired secured by United States Letters Patent is:

1. In a computing system that includes one or more processors, persistent media configured to store information that persists through power loss of the computing system, and system memory that is directly accessed by the one or more processors, the computing system having applications running multiple instances of the application, the instances of the application having both a normal mode and a recovery mode, a method for permitting an instance of an application to operate in recovery mode while ensuring reliable message processing for messages received during the recovery mode operations of the instance governing a transaction, wherein a transaction is an exchange of messages following a particular message exchange pattern with a particular client system, the method comprising the following:

a step for the computing system engaging in multiple concurrent transactions with at least one client computing system, wherein each of the multiple transactions has an associated instance of an application, each instance having an associated mode distinct from the mode of the other instances;

an act of receiving a message corresponding to a particular message transaction from among the multiple transactions, wherein the message is a normal message suitable for normal mode operations with respect to the particular message transaction and an instance of an application governing the particular message transaction is in the recovery mode rather than the normal mode;

upon receiving the message, an act of determining from state information corresponding to the particular message transaction that the instance of an application governing the particular message transaction is in the recovery mode rather than the normal mode;

an act of determining that the received message is a normal message suitable for normal mode operations with respect to the particular message transaction, wherein the received message cannot be processed by the instance governing the particular message transaction until the instance governing the particular message transaction is in the normal mode;

an act of placing the received message into a persistent queue associated with the instance governing the particular transaction for later processing when the instance governing the particular transaction is in the normal mode rather than the recovery mode, wherein messages related to other transactions continue to be processed if they are in the normal mode; and an act of completing recovery mode operation for the instance governing the particular transaction.

2. The method in accordance with claim 1, further comprising the following:

an act of loading the state information from persistent media into system memory in response to the act of receiving the message.

3. The method in accordance with claim 1, further comprising the following:
an act of saving the state information into persistent media after the act of placing the message into the persistent queue.

4. The method in accordance with claim 1, wherein the message is a first message, the method further comprising the following:
an act of receiving a second message corresponding to the particular message transaction;
upon receiving the second message, an act of determining from state information corresponding to the particular message transaction that the instance governing the state information is still in the recovery mode rather than the normal mode;
an act of determining that the second message is a recovery message suitable for recovery mode operations and not suitable for normal mode operations; and
an act of processing the recovery message.

5. The method in accordance with claim 4, further comprising the following:
an act of loading the state information from persistent media into system memory in response to the act of receiving the second message.

6. The method in accordance with claim 4, further comprising the following:
an act of saving the state information into persistent media after the act of processing the recovery message.

7. The method in accordance with claim 4, further comprising the following:
an act of determining that the processing of the recovery message completes recovery of the instance governing the particular message transaction.

8. The method in accordance with claim 7, further comprising the following:
an act of setting the state information to reflect normal operation mode, wherein the act of saving the state information into persistent media after the act of processing the recovery message occurs after the act of setting the state information to reflect normal operation mode.

9. The method in accordance with claim 8, further comprising the following:
an act of processing one or more normal messages in the queue in response to the act of determining that the processing of the recovery message completes recovery of the instance governing the particular message transaction.

10. A computer program product for use in a computing system that includes one or more processors, persistent media configured to store information that persists through power loss of the computing system, and system memory that is directly accessed by the one or more processors, the computing system having applications running multiple instances of the application, the instances of the application having both a normal mode and a recovery mode, the computer program product for implementing a method for permitting an instance of an application to operate in recovery mode while ensuring reliable message processing for messages received during the recovery mode operations of the instance governing a transaction, wherein a transaction is an exchange of messages following a particular message exchange pattern with a particular client, the computer program product comprising one or more computer-readable storage media having stored thereon computer-executable instructions that, when executed by the one or more processors, cause the computing system to perform the following:
a step for the computing system engaging in multiple concurrent transactions with at least one client computing system, wherein each of the multiple transactions has an associated instance of an application, each instance having an associated mode distinct from the mode of the other instances;
an act of receiving a message corresponding to a particular message transaction from among the multiple transactions, wherein the message is a normal message suitable for normal mode operations with respect to the particular message transaction and an instance of an application governing the particular message transaction is in a recovery mode rather than a normal mode;
upon receiving the message, an act of determining from state information corresponding to the particular message transaction that the instance of an application governing the particular message transaction is in recovery mode rather than the normal mode;
an act of determining that the received message is a normal message suitable for normal mode operations with respect to the particular message transaction, wherein the message cannot be processed by the instance governing the particular message transaction until the instance governing the particular message transaction is in the normal mode;
an act of placing the received message into a persistent queue associated with the instance governing the particular transaction for later processing when the instance governing the particular transaction is in the normal mode rather than the recovery mode, wherein messages related to other transactions continue to be processed if they are in the normal mode; and
an act of completing recovery mode operation for the instance governing the particular transaction.

11. The computer program product in accordance with claim 10, wherein the one or more computer-readable storage media comprise physical memory media.

12. The computer program product in accordance with claim 11, wherein the physical memory media comprises persistent media.

13. The computer program product in accordance with claim 11, wherein the physical memory media comprises system memory.

14. The computer program product in accordance with claim 10, wherein the one or more computer-readable storage media further have stored thereon computer-executable instructions that, when executed by the one or more processors, cause the computing system to further perform the following:
an act of loading the state information from persistent media into system memory in response to the act of receiving the message.

15. The computer program product in accordance with claim 10, wherein the one or more computer-readable storage media further have stored thereon computer-executable instructions that, when executed by the one or more processors, cause the computing system to further perform the following:
an act of saving the state information into persistent media after the act of placing the message into the persistent queue.

16. The computer program product in accordance with claim 10, wherein the message is a first message, and the one or more computer-readable storage media further have stored thereon computer-executable instructions that, when executed by the one or more processors, cause the computing system to further perform the following:

an act of receiving a second message corresponding to the particular message transaction;

upon receiving the second message, an act of determining from state information corresponding to the particular message transaction that the instance governing the state information is still in the recovery mode rather than the normal mode;

an act of determining that the second message is a recovery message suitable for recovery mode operations and not suitable for normal mode operations; and an act of processing the recovery message.

17. The computer program product in accordance with claim 16, wherein the one or more computer-readable storage media further have stored thereon computer-executable instructions that, when executed by the one or more processors, cause the computing system to further perform the following:

an act of loading the state information from persistent media into system memory in response to the act of receiving the second message.

18. The computer program product in accordance with claim 16, wherein the one or more computer-readable storage media further have stored thereon computer-executable instructions that, when executed by the one or more processors, cause the computing system to further perform the following:

an act of saving the state information into persistent media after the act of processing the recovery message.

19. The computer program product in accordance with claim 16, wherein the one or more computer-readable storage media further have stored thereon computer-executable instructions that, when executed by the one or more processors, cause the computing system to further perform the following:

an act of determining that the processing of the recovery message completes recovery of the instance governing the particular message transaction.

20. The computer program product in accordance with claim 19, wherein the one or more computer-readable storage media further have stored thereon computer-executable instructions that, when executed by the one or more processors, cause the computing system to further perform the following:

an act of setting the state information to reflect normal operation mode, wherein the act of saving the state information into persistent media after the act of processing the recovery message occurs after the act of setting the state information to reflect normal operation mode.

21. The computer program product in accordance with claim 20, wherein the one or more computer-readable storage media further have stored thereon computer-executable instructions that, when executed by the one or more processors, cause the computing system to further perform the following:

an act of processing one or more normal messages in the queue in response to the act of determining that the processing of the recovery message completes recovery of the instance governing the particular message transaction.

22. In a computing system that includes one or more processors, persistent media configured to store information that persists through power loss of the computing system, and system memory that is directly accessed by the one or more processors, the computing system having applications running multiple instances of the application, the instances of the application having both a normal mode and a recovery mode, a method for permitting an instance of an application to operate in recovery mode while ensuring reliable message processing for messages received during the recovery mode operations of the instance governing a transaction, wherein a transaction is an exchange of messages following a particular message exchange pattern with a particular client system, the method comprising the following:

a step for the computing system engaging in multiple concurrent transactions with at least one client computing system, wherein each of the multiple transactions has an associated instance of an application, each instance having an associated mode distinct from the mode of the other instances;

an act of receiving a message corresponding to a particular message transaction from among the multiple transactions, wherein the message is a normal message suitable for normal mode operations with respect to the particular message transaction and an instance of an application governing the particular message transaction is in the recovery mode rather than the normal mode;

upon receiving the message, an act of determining from state information corresponding to the particular message transaction that the instance of an application governing the particular message transaction is in the recovery mode rather than the normal mode;

while the instance governing the particular message transaction is in a recovery mode, an act of receiving a second message corresponding to a second message transaction, wherein the message is a normal message suitable for normal mode operations with respect to the second message transaction and a second instance governing the second message transaction is in a normal mode rather than a recovery mode;

an act of the second instance governing the second message transaction processing the message; and a step for recovering while preserving received normal messages corresponding to the particular message transaction for use in normal mode.

23. The method in accordance with claim 22, wherein the step for recovering while preserving such messages comprises the following:

an act of determining that the received message is a normal message suitable for normal mode operations, wherein the instance cannot process the normal message when the instance is in the recovery mode;

an act of placing the received message into a persistent queue for later processing when the instance is in the normal mode rather than the recovery mode; and an act of completing recovery mode operation.

* * * * *